(12) United States Patent
Pu

(10) Patent No.: US 11,321,229 B2
(45) Date of Patent: May 3, 2022

(54) SYSTEM CONTROLLER AND SYSTEM GARBAGE COLLECTION METHOD

(71) Applicant: HUAWEI TECHNOLOGIES CO., LTD., Guangdong (CN)

(72) Inventor: Guiyou Pu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/119,691

(22) Filed: Dec. 11, 2020

(65) Prior Publication Data

US 2021/0096983 A1 Apr. 1, 2021

Related U.S. Application Data

(63) Continuation of application No. PCT/CN2019/072095, filed on Jan. 17, 2019.

(30) Foreign Application Priority Data

Jul. 6, 2018 (CN) .......................... 201810739117.X
Aug. 21, 2018 (CN) .......................... 201810954801.X

(51) Int. Cl.
G06F 12/02 (2006.01)
G06F 11/10 (2006.01)

(52) U.S. Cl.
CPC ...... *G06F 12/0238* (2013.01); *G06F 11/1008* (2013.01); *G06F 12/0253* (2013.01); *G06F 2212/202* (2013.01); *G06F 2212/702* (2013.01)

(58) Field of Classification Search
None
See application file for complete search history.

(56) References Cited

U.S. PATENT DOCUMENTS

| | | | |
|---|---|---|---|
| 2014/0164695 A1 | 6/2014 | Sun et al. | |
| 2015/0067244 A1 | 3/2015 | Kruger | |
| 2017/0242785 A1* | 8/2017 | O'Krafka | ................ G06F 3/065 |
| 2017/0242790 A1 | 8/2017 | O'Krafka et al. | |
| 2017/0249969 A1* | 8/2017 | Aiello | ................... G06F 3/0659 |
| 2018/0239671 A1* | 8/2018 | Wei | ........................ G06F 3/0619 |

FOREIGN PATENT DOCUMENTS

| | | |
|---|---|---|
| CN | 103488583 A | 1/2014 |
| CN | 103699337 A | 4/2014 |
| CN | 103902465 A | 7/2014 |
| CN | 105573681 A | 5/2016 |
| CN | 108304139 A | 7/2018 |
| EP | 3336706 A1 | 6/2018 |
| WO | 2016174279 A1 | 11/2016 |
| WO | 2017173623 A1 | 10/2017 |
| WO | 2018086075 A1 | 5/2018 |

* cited by examiner

*Primary Examiner* — Tracy C Chan

(57) ABSTRACT

A flash array provided in embodiments includes a controller and a solid state disk group. The controller counts a data volume of invalid data included in each of a plurality of stripes, and select at least one target stripe from the plurality of stripes. The target stripe is a stripe that includes a maximum volume of invalid data among the plurality of stripes. Then, the controller instructs the solid state disk group to move valid data in the target stripe, and instructs the solid state disk group to delete a correspondence between a logical address of the target stripe and an actual address of the target stripe. This can reduce write amplification, thereby prolonging a life span of the solid state disk.

15 Claims, 4 Drawing Sheets

---

601 — A controller 11 determines whether a use status of logical addresses provided by a solid state disk group satisfies a first specified condition 602 — When the use status of the logical addresses provided by the solid state disk group satisfies the first specified condition, instruct the solid state disk group to perform system garbage collection at a granularity of a stripe; otherwise, instruct the solid state disk group to perform system garbage collection at a granularity of a logical chunk group

SYSTEM CONTROLLER AND SYSTEM GARBAGE COLLECTION METHOD

CROSS-REFERENCE TO RELATED APPLICATIONS

This application is a continuation of International Application No. PCT/CN2019/072095, filed on Jan. 17, 2019, which claims priority to Chinese Patent Application No. 201810954801.X, filed on Aug. 21, 2018 and Chinese Patent Application No. 201810739117.X, filed on Jul. 6, 2018. All of the aforementioned applications are hereby incorporated by reference in their entireties.

TECHNICAL FIELD

This application relates to the storage field, and more specifically, to a system controller and a system garbage collection method.

BACKGROUND

A flash array is a storage system that includes a solid state disk and a system controller. The system controller allocates a logical address to the solid state disk on a logical chunk group (CKG) basis. When available space in the system is insufficient, the system controller performs system garbage collection. In a system garbage collection operation, the system controller instructs the solid state disk to move all valid data in a logical chunk group to a new logical chunk group, and then release a logical address of the original logical chunk group. Consequently, there are a large quantity of write amplification times in the solid state disk.

SUMMARY

This application provides a system controller and a system garbage collection method, to reduce a quantity of write amplification times in a solid state disk.

A first aspect provides a system controller. The system controller includes a processor and an interface, where the interface is configured to communicate with a solid state disk group. The solid state disk group includes a plurality of solid state disks, the solid state disk group includes a logical chunk group, and the logical chunk group includes a plurality of stripes. In actual application, the logical chunk group includes a plurality of logical chunks, and each logical chunk comes from a different solid state disk. The processor is configured to: count a data volume of invalid data included in each of the plurality of stripes, and select at least one target stripe from the plurality of stripes, where the target stripe is a stripe that includes a maximum volume of invalid data among the plurality of stripes or a stripe that includes invalid data whose volume exceeds a specified volume threshold. Then, the controller sends instruction information to the solid state disk group to instruct the solid state disk group to collect the target stripe. After the collection, a correspondence between a logical address and an actual address of the target stripe is canceled, but the logical address of the target stripe is not released until a logical address of the logical chunk group in which the target stripe is located is released. Herein, the instructing the solid state disk group to collect the target stripe specifically includes: sending a data read instruction, a data write instruction, and an unmap command to each solid state disk included in the solid state disk group. The data read instruction is used to read valid data in the target stripe, the data write instruction is used to instruct the solid state disk to write the valid data into a newly allocated logical address, and the unmap command is used to instruct the solid state disk group to release a mapping relationship between an original logical address of the valid data and an actual address.

In the first aspect, there may be one or more logical chunk groups. When there is one logical chunk group, the target stripe is a stripe that is among stripes included in the logical chunk group and whose data volume of invalid data exceeds the specified volume threshold. In addition, the logical chunk group may be a logical chunk group that includes a maximum volume of invalid data among the plurality of logical chunk groups in the solid state disk group. In this case, the target stripe is a stripe that includes a maximum volume of invalid data in the entire solid state disk group. When there are a plurality of logical chunk groups, the target stripe is a stripe that is among stripes included in the plurality of logical chunk groups and whose data volume of invalid data exceeds the specified volume threshold. Because of a larger selection range, the target stripe in this case is also a stripe that includes more invalid data.

In the system controller provided in the first aspect, system garbage collection is performed at a granularity of a stripe. Compared with system garbage collection performed at a granularity of a logical chunk group, the granularity of a stripe is finer, and therefore, an area with dense invalid data can be found more accurately. When available space of a same size is released, write amplification can be reduced in the system garbage collection performed at the granularity of a stripe, thereby prolonging a life span of a solid state disk.

In a first implementation of the first aspect, a quantity of logical addresses provided by each of the plurality of solid state disks for the system controller is greater than a quantity of actual addresses of the solid state disk. Because the quantity of logical addresses of the solid state disk is greater than the quantity of actual addresses, the system controller has more allocable logical addresses. This can avoid a problem of insufficient allocable logical addresses to some extent.

In a second implementation of the first aspect, the processor is further configured to: before instructing the solid state disk group to collect the target stripe, determine that available space of the solid state disk group is insufficient. The insufficient available space of the solid state disk group is a trigger condition for the system garbage collection.

In a third implementation of the first aspect, the processor is further configured to: when all stripes included in the logical chunk group are collected, release the logical address allocated by the processor to the logical chunk group, where the logical address of the target stripe is a subset of the logical address of the logical chunk group. When only one stripe or some stripes in the logical chunk group are collected, logical addresses of these stripes are not released, and the logical addresses of these stripes cannot be released until all stripes included in the logical chunk group are collected. The released logical address can be allocated to another logical chunk group, to avoid a problem that logical addresses allocable by the system controller are insufficient.

In a fourth implementation of the first aspect, the processor is further configured to: determine an IO request to which data in the target stripe belongs; and when some data included in the IO request is stored in the another stripe, move valid data in the some data to a newly allocated logical address, where the newly allocated logical address is contiguous to a new logical address to which the valid data in the target stripe is moved. This is to ensure that data belonging to a same IO request is stored together as much as possible, to facilitate a search.

With reference to the fourth implementation of the first aspect, in a fifth implementation of the first aspect, the another stripe is an adjacent stripe of the target stripe, and the adjacent stripe is a stripe whose logical address is contiguous to the logical address of the target stripe.

A second aspect provides a system controller. The system controller includes a processor and an interface, where the interface is configured to communicate with a solid state disk group. The solid state disk group includes a plurality of solid state disks, the solid state disk group includes a logical chunk group, and the logical chunk group includes a plurality of stripes. In actual application, the logical chunk group includes a plurality of logical chunks, and each logical chunk comes from a different solid state disk. The processor is configured to: determine whether a use status of logical addresses provided by the solid state disk group satisfies a first specified condition, and when the use status of the logical addresses provided by the solid state disk group satisfies the first specified condition, instruct the solid state disk group to perform garbage collection on a stripe basis, and keep a logical address of the target stripe unreleased until a logical address of the logical chunk group is released; or the processor is further configured to: when the use status of the logical addresses provided by the solid state disk group does not satisfy the first specified condition, instruct the solid state disk group to perform garbage collection on a logical chunk group basis, where all logical addresses of all stripes included in a collected logical chunk group are released.

The first specified condition in the second aspect may be that a quantity of allocable logical addresses in the logical addresses provided by the solid state disk group is less than a specified first address threshold, or may be that a quantity of used logical addresses in the logical addresses provided by the solid state disk group is greater than a specified second address threshold, or may be that a ratio of a quantity of used logical addresses in the logical addresses provided by the solid state disk group to a total quantity of logical addresses is greater than a specified third address threshold, or may be whether a ratio of a quantity of available logical addresses in the logical addresses provided by the solid state disk group to the total quantity of logical addresses is less than a specified fourth address threshold.

In the system controller provided in the second aspect, a granularity of performing system garbage collection is determined depending on a different trigger condition. When available space is insufficient, the system garbage collection is performed at a granularity of a stripe, to reduce write amplification. As the quantity of allocable logical addresses decreases, when the quantity of allocable logical addresses is less than the specified address threshold, the solid state disk group is instructed to perform the garbage collection on a logical chunk group basis, to increase the allocable logical addresses of the system controller. Therefore, according to this implementation, write amplification can be reduced, and a problem of insufficient allocable logical addresses can also be avoided.

In a first implementation of the second aspect, a quantity of logical addresses provided by each of the plurality of solid state disks for the system controller is greater than a quantity of actual addresses of the solid state disk.

In a second implementation of the second aspect, the processor is further configured to: before determining whether the use status of the logical addresses provided by the solid state disk group satisfies the first specified condition, determine that available space of the solid state disk group satisfies a second specified condition. The second specified condition may be that a size of the available space of the solid state disk group is less than a specified space threshold, or may be that a size of used space of the solid state disk group is greater than a specified space threshold, or may be that a data volume of invalid data in a stripe reaches a specified threshold.

A third aspect provides a system garbage collection method, and the method is applied to the system controller provided in the first aspect and any implementation of the first aspect.

A fourth aspect provides another system garbage collection method, and the method is applied to the system controller provided in the second aspect and any implementation of the second aspect.

A fifth aspect provides a system garbage collection apparatus, and modules included in the apparatus are configured to implement the system garbage collection method provided in the third aspect.

A sixth aspect provides another system garbage collection apparatus, and modules included in the apparatus are configured to implement the system garbage collection method provided in the fourth aspect.

A seventh aspect provides a flash array, including the system controller and the solid state disk group that are provided in any implementation of the first aspect, where the solid state disk group includes a plurality of solid state disks, the solid state disk group includes a logical chunk group, and the logical chunk group includes a plurality of stripes.

An eighth aspect provides a flash array, including the system controller and the solid state disk group that are provided in any implementation of the second aspect, where the solid state disk group includes a plurality of solid state disks, the solid state disk group includes a logical chunk group, and the logical chunk group includes a plurality of stripes.

A ninth aspect provides a computer program product for system garbage collection, including a computer-readable storage medium storing program code, where an instruction included in the program code is used to perform the method described in the first aspect.

A tenth aspect provides a computer program product for system garbage collection, including a computer-readable storage medium storing program code, where an instruction included in the program code is used to perform the method described in the second aspect.

DESCRIPTION OF EMBODIMENTS

Embodiments of the present disclosure provide a system garbage collection method and a storage system, to reduce write amplification, thereby prolonging a life span of a solid state disk.

Figure 1:
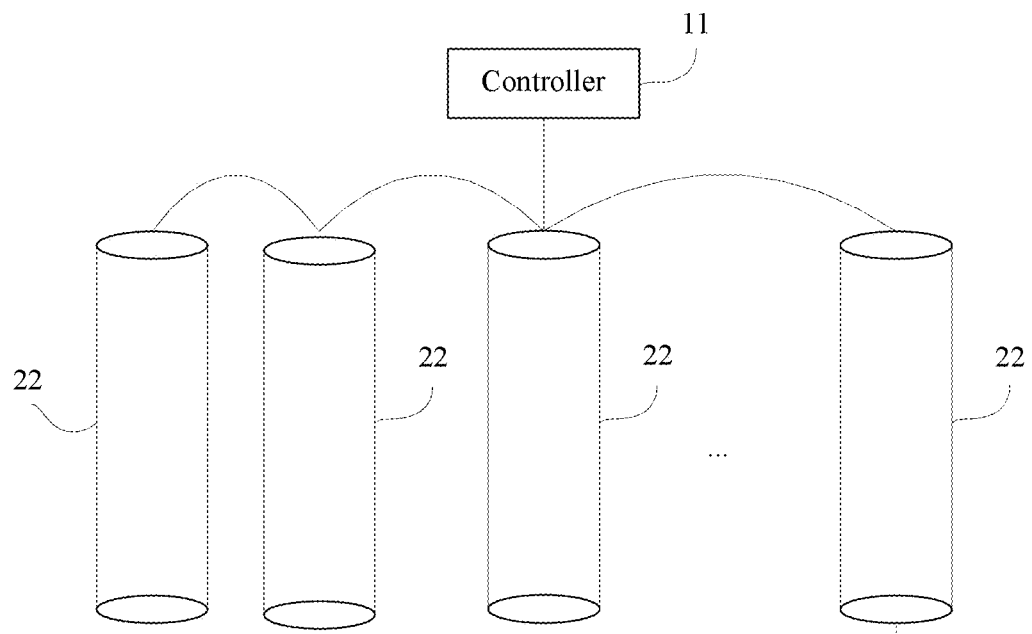
FIG. 1 is an application scenario diagram according to an embodiment of the present disclosure.

FIG. 1 is a composition diagram of a flash array according to an embodiment of the present disclosure. The flash array shown in FIG. 1 includes at least one controller (a controller 11 shown in FIG. 1) and a plurality of solid state disks 22. The controller 11 is connected to a host (not shown in the figure) by using a storage area network (SAN). The controller 11 may be a computing device, such as a server or a desktop computer. An operating system and an application program are installed on the controller 11. The controller 11 may receive an input/output (I/O) request from the host. The controller 11 may further store data (if existent) carried in the I/O request, and write the data into the solid state disk 22. The solid state disk (SSD) is a memory with a flash memory chip as a medium, and is also referred to as a solid state drive (SSD).

FIG. 1 is merely an example for description. In actual application, a storage system may include at least two controllers. A physical structure and a function of each controller are similar to those of the controller 11. In addition, connection manners between the controllers and between any controller and the solid state disk 22 are not limited in this embodiment provided that the controllers can communicate with each other and that each controller and the solid state disk 22 can communicate with each other. Moreover, in this embodiment, the controller 11 usually sends an instruction to the plurality of solid state disks. For ease of description, a set including the plurality of solid state disks 22 is referred to as a solid state disk group.

Figure 2:
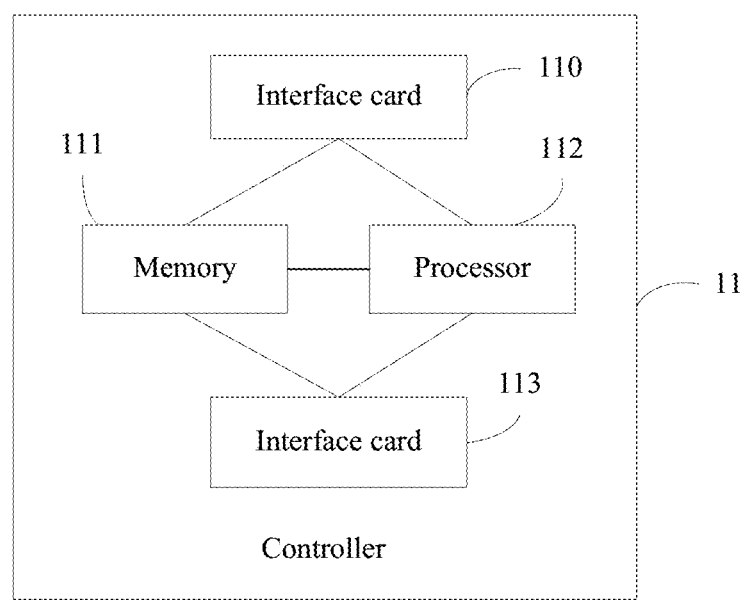
FIG. 2 is a structural diagram of a controller according to an embodiment of the present disclosure.

FIG. 2 is an example structural diagram of the controller 11. As shown in FIG. 2, the controller 11 includes an interface card 110, a processor 112, and an interface card 113.

The interface card 110 is configured to communicate with a host, and the controller 11 may receive an operation instruction of the host by using the interface card 110. The processor 112 may be a central processing unit (CPU). In this embodiment of the present disclosure, the processor 112 may be configured to receive an I/O request from the host and process the I/O request. The I/O request may be a data write request or a data read request. The processor 112 may further send data in the data write request to the solid state disk 22. In addition, the processor 112 may further be configured to perform a system garbage collection operation. The interface card 113 is configured to communicate with the solid state disk 22, and the controller 11 may send, by using the interface card 113, a data write request (including data and a life cycle level of the data) to the solid state disk 22 for storage.

Optionally, the controller 11 may further include a memory 111. The memory 111 is configured to temporarily store data received from the host or data read from the solid state disk 22. When receiving a plurality of data write requests sent by the host, the controller 11 may temporarily store data in the plurality of data write requests to the memory 111. When a capacity of the memory 111 reaches a specific threshold, data stored in the memory 111 and a logical address allocated to the data are sent to the solid state disk 22. The solid state disk 22 stores the data. The memory 111 includes a volatile memory, a flash memory chip, or a combination thereof. The volatile memory is, for example, a random-access memory (RAM). The flash memory chip is any machine-readable medium capable of storing program code, such as a floppy disk, a hard disk, a solid state disk (solid state disk, SSD), or a compact disc. The memory 111 has a power failure protection function. The power failure protection function means that the data stored in the memory 111 is not lost when a system is powered off and then powered on.

After data is written into a storage system, the controller 11 needs to record validity of the data. The validity of the data is determined based on whether the data is modified. If the data is written for the first time, the data may be recorded as valid (the data is referred to as valid data). If the data is modified, data before the modification is recorded as invalid (the data is referred to as invalid data). Specifically, the validity of the data may be recorded by using a bitmap. For example, each "bit" in the bitmap is corresponding to a logical address of data with a size of 1 KB. When the "bit" is 1, it indicates that the data stored at the logical address is valid; or when the "bit" is 0, it indicates that the data stored at the logical address is invalid. The bitmap may be stored in the memory 111, or may be stored in the solid state disk.

It should be noted that the controller 11 is a system controller. The system controller is an independent device, and is different from a control chip in the solid state disk. In this embodiment, the control chip in the solid state disk is referred to as a flash memory controller.

The solid state disk 22 includes the flash memory controller and a plurality of flash memory chips. The flash memory controller is configured to perform an operation such as executing a data write request or a data read request sent by the controller 11.

The flash memory controller includes a flash translation layer (FTL). The flash translation layer is configured to store a correspondence between a logical address and an actual address of data. Therefore, the flash translation layer is configured to translate, into an actual address of data in the solid state disk, a logical address in a data write request or a data read request sent by the system controller. The logical address of the data is allocated by the system controller, and is a subset of a logical address range provided by the solid state disk for the system controller. The logical address of the data includes a start logical address and a length. The start logical address indicates a location at which the data is located in the segment, and the length indicates a size of the data. The actual address of the data may be a physical address of the data in the solid state disk, or may be an address that is obtained by virtualizing the physical address and that is visible only to the flash memory controller. The actual address obtained through virtualization is invisible to the system controller.

The solid state disk usually includes one or more flash memory chips. Each flash memory chip includes several erase chunks. The solid state disk performs reading or writing on a page basis, but an erase operation can be performed based only on one erase chunk. The erase operation is setting all bits of the chunk to "1". Before the erase operation, the flash memory controller needs to first copy valid data in the erase chunk into a blank page of another chunk.

Each erase chunk includes a plurality of pages. When executing a data write request, the solid state disk writes data on a page basis. For example, the controller 11 sends a data write request to the flash memory controller. The data write request includes a logical address of data. After receiving the data write request, the flash memory controller successively writes the data into one or more erase chunks according to a receiving time sequence. Successively writing the data into the one or more erase chunks means that the flash memory controller searches for a blank erase chunk and writes the data into the blank erase chunk until the blank erase chunk is full. When a size of the data exceeds a capacity of the erase chunk, the flash memory controller searches for a next blank erase chunk, and continues to perform writing. The flash translation layer establishes and stores a correspondence between the logical address and an actual address of a page into which the data is written. When the controller 11 sends a data read request to the flash memory controller to request to read the data, the data read request includes the logical address. The flash memory controller reads the data based on the logical address and the correspondence between the logical address and the actual address, and sends the data to the controller 11.

In a flash array, a single solid state disk may be faulty, leading to a data loss. In this embodiment, a redundant array of independent disks (Redundant Array of Inexpensive Disks, RAID) technology is used to ensure a data possibility. The following describes a redundancy protection mechanism for the data in the solid state disk.

First, the controller 11 performs space management on the solid state disk in a form of a logical chunk (CK). The logical chunk is a spatial concept. For example, a size of the logical chunk is 4 MB, but is not limited to 4 MB. Logical chunks from different solid state disks may form a logical chunk set. The controller 11 then groups the logical chunks in the logical chunk set into a data group and a check group based on a specified RAID type. The data group includes at least two logical chunks configured to store data, and the check group includes at least one logical chunk configured to store check data of the data. In this embodiment, the logical chunk set that includes the data group and the check group is referred to as a logical chunk group. When the memory 111 is filled with data of a specific size, the controller 11 may divide the data into a plurality of data units based on the specified RAID type, obtain a check unit through calculation, and send the data units and the check unit to the solid state disk, to store the data units and the check unit to the logical chunk group. Each logical chunk in the data group is configured to store the data unit, and each logical chunk in the check group is configured to store the check unit. After the storage, the data units and corresponding check units form a stripe. The logical chunk group includes a plurality of stripes.

Figure 3:
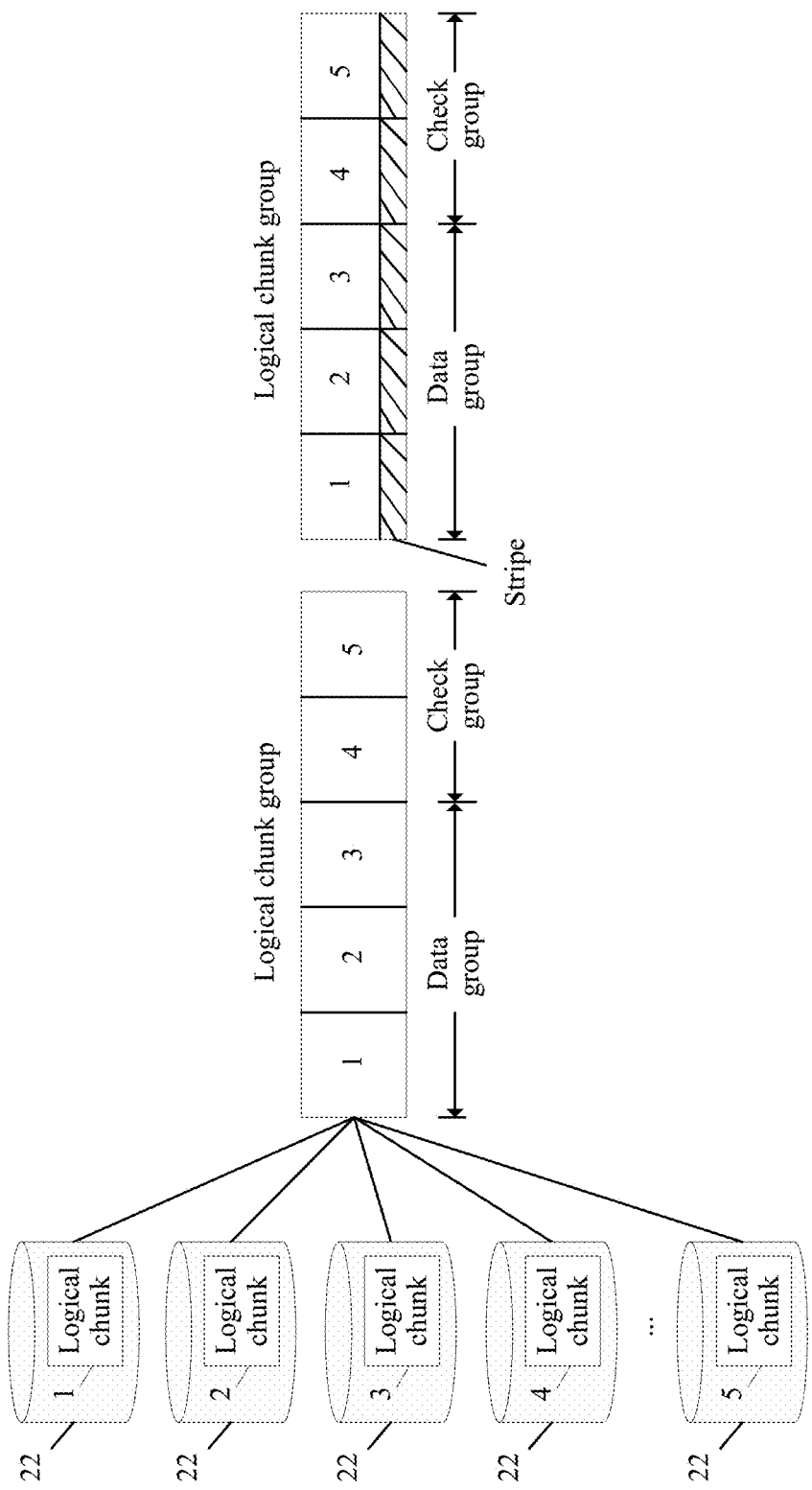
FIG. 3 is a schematic diagram of a logical chunk group according to an embodiment of the present disclosure.

Both the data unit and the check unit included in the stripe may be referred to as a stripe unit. In this embodiment, for example, a size of the stripe unit is 8 KB, but is not limited to 8 KB. As shown in FIG. 3, it is assumed that one logical chunk is extracted from each of five solid state disks to form a logical chunk set, and then the controller 11 groups the logical chunks in the logical chunk set based on a RAID type (using a RAID 6 as an example). For example, a logical chunk 1, a logical chunk 2, and a logical chunk 3 belong to a data chunk group, and a logical chunk 4 and a logical chunk 5 belong to a check chunk group. When a size of data stored in the memory 111 reaches 24 KB (8 KB×3), the data is divided into three data units, and a size of each data unit is 8 KB. Then, two check units are obtained through calculation, and a size of each check unit is also 8 KB. The controller 11 sends the data units and the check units to the solid state disk, to store the data units and the check units to the logical chunk group (as shown in a shadow area in FIG. 3). It can be understood that, according to a RAID 6 redundancy protection mechanism, when any two data units or check units become invalid, the invalid units can be reconstructed based on a remaining data unit or check unit.

In this embodiment, when the memory 111 is filled with data that is equal to a size of one stripe, the controller 11 sends a data write request to the solid state disk group, so that the solid state disk 22 included in the solid state disk group writes the data into a stripe in the logical chunk group. In this case, the controller 11 needs to determine whether there is an allocated logical chunk group. If there is an allocated logical chunk group and the logical chunk group still has sufficient space to accommodate the data, the controller 11 may instruct the solid state disk group to write the data into the allocated logical chunk group. Specifically, the controller 11 obtains a segment of unused logical address from a logical address range of the allocated logical chunk group, adds the logical address to the data write request, and sends the data write request to the solid state disk 22. After storing the data, the solid state disk 22 establishes, at the flash translation layer, a mapping relationship between the logical address and an actual address at which the data is stored.

In the foregoing example, if the controller 11 determines that there is no allocated logical chunk group in a system, or that the allocated logical chunk group is filled with written data, the controller 11 needs to create a logical chunk group. A creation process may be: The controller 11 determines, based on a record, on the controller 11, of available space of each solid state disk, that remaining space of the system is enough to create a logical chunk group. Then, the controller 11 obtains one logical chunk separately from different solid state disks 22, and forms the new logical chunk group (reference may be made to the foregoing descriptions of the logical chunk group) based on the specified RAID type by using these logical chunks. Subsequently, the controller 11 allocates a segment of logical address to each logical chunk, and a set of these logical addresses is a logical address of the new logical chunk group.

To ensure that there is always sufficient available space in the flash array to create a logical chunk group, the controller 11 may monitor the available space of each solid state disk 22 in real time or periodically, to learn available space of the entire system. When the available space of the system is smaller than a specified space threshold, system garbage collection may be started. For example, a capacity of one solid state disk 22 is 128 GB, and a total capacity of all solid state disks (it is assumed that the flash array includes 10 solid state disks) included in the flash array shown in FIG. 1 is 1280 GB. The space threshold may be set to 640 GB. To be specific, when data stored in the flash array reaches half the total capacity, remaining available space also reaches the space threshold. In this case, the controller 11 may perform system garbage collection. It can be understood that 640 GB is only an example of the space threshold, and the space threshold may alternatively be set to another value. In addition, when used space of the system reaches the specified space threshold, system garbage collection may also be triggered. Moreover, in another embodiment of the present disclosure, when a data volume of invalid data included in one or more stripes reaches the specified threshold, system garbage collection may also be started. The system garbage collection is different from garbage collection inside the solid state disk. The garbage collection inside the solid state disk is completed by the solid state disk.

The controller 11 may perform system garbage collection on a logical chunk group basis. For example, the controller 11 obtains a logical address of valid data in a logical chunk group based on a bitmap, and sends the logical address of the valid data to the solid state disk group, so that each solid state disk 22 can read the data based on the logical address of the valid data and send the data to the controller 11. The controller 11 allocates a new logical address to the valid data, where the new logical address belongs to a new logical chunk group; and sends the allocated new logical address to the solid state disk group. After writing the valid data into a new chunk, each solid state disk 22 stores a mapping relationship between an actual address and the new logical address. Then, the controller 11 sends an unmap command or a trim command to the solid state disk group, where the unmap command includes a logical address range of the to-be-collected logical chunk group. After receiving the unmap command, each solid state disk 22 deletes a correspondence, stored at the flash translation layer, between a logical address in the logical address range and an actual address. The solid state disk 22 may further mark, as a chunk that includes no valid data, a chunk corresponding to the actual address of the valid data before being moved. Subsequently, the controller 11 may release the logical address range of the to-be-collected logical chunk group and actual physical space (which may also be understood as an actual address) that is occupied by the logical chunk group.

If system garbage collection is performed on a logical chunk group basis, a blank logical chunk group can be released only after all valid data in a logical chunk group is moved to a new logical chunk group. If system garbage collection is performed at a finer granularity than the logical chunk group, available space of a same size can be released while data is moved for a relatively small quantity of times.

In this embodiment, the controller 11 performs system garbage collection at a granularity of a stripe. The controller 11 may count, based on a bitmap, data volumes of invalid data included in stripes in a logical chunk group, and sort the data volumes in descending order. When a trigger condition for system garbage collection is satisfied, a stripe that includes a maximum volume of invalid data is selected for collection. Specifically, the controller 11 obtains a logical address of valid data in one stripe based on the bitmap, and sends the logical address of the valid data to the solid state disk group, so that each solid state disk 22 reads the valid data from the original logical address. The controller 11 allocates a new logical address to the valid data from unused logical addresses, where the new logical address belongs to a new logical chunk group; and sends the new logical address to the solid state disk group, so that the solid state disk 22 writes the valid data into a new chunk, and then stores a mapping relationship between an actual address and the new logical address. Then, the controller 11 sends an unmap command to the solid state disk group, where the unmap command includes a logical address range of the to-be-collected stripe. After receiving the unmap command, each solid state disk 22 deletes a correspondence, stored at the flash translation layer, between a logical address in the logical address range and an actual address of the valid data. The solid state disk 22 may further mark, as a chunk that includes no valid data, a chunk corresponding to the actual address of the valid data before being moved. A difference from the system garbage collection performed at a granularity of a logical chunk group further lies in that in the collection performed on the stripe basis, the unmap command includes only the logical address range of the stripe, but in the collection performed on the logical chunk group basis, the unmap command includes the logical address range of the entire logical chunk group. In this case, a range of valid data that needs to be moved is different. In the collection performed on the stripe basis, valid data of an actual address range corresponding to the logical address range of the stripe needs to be moved; in the collection performed on the logical chunk group basis, valid data of an actual address range corresponding to the logical address range of the entire logical chunk group needs to be moved. In this way, available space of a same size can be released while data is moved for a relatively small quantity of times.

It should be noted that, although a stripe in a logical chunk group is collected, and actual physical space occupied by the stripe is blank, a logical address occupied by the stripe still cannot be released for the reason that the logical chunk group is a basic unit for logical address allocation/release. Therefore, the logical address can be released only after all stripes included in the logical chunk group are collected.

A logical address exposed by a conventional solid state disk to the system controller is equivalent to an actual address of the conventional solid state disk. System garbage collection is performed to release more logical addresses to be used by the controller. However, it is learnt from the foregoing descriptions that, if a system garbage collection manner at a granularity of a stripe is used for the conventional solid state disk, even if some stripes in a logical chunk group are collected, logical addresses of the stripes still cannot be released to be used by the controller 11. Although physical space of the solid state disk has been released through system garbage collection and new data can be written into the physical space, allocable logical addresses are still insufficient for the controller 11. There are sufficient available logical addresses only after a garbage collection operation is completed on all data in the entire logical chunk group.

To better ensure that garbage collection is performed at the granularity of a stripe, specifically, to ensure there are sufficient logical addresses, based on the foregoing embodiment, this application provides another embodiment. In this embodiment, a solid state disk (virtual block solid state disk for short) using a virtual block (vblock) technology is introduced. In other words, a solid state disk in a flash array provided in this embodiment of the present disclosure is a virtual block solid state disk. A feature of the virtual block solid state disk is that a quantity of logical addresses exposed by the virtual block solid state disk to the system controller is greater than a quantity of actual addresses of the virtual block solid state disk. A solid state disk with a capacity of 128 GB is used as an example. A logical address range provided by the solid state disk is 0 KB to 131072 KB in a conventional manner. However, after the virtual block technology is used, a logical address range provided by a solid state disk with a same capacity is greater than the original logical address range. For example, the logical address range of the solid state disk may be 0 KB to 262144 KB, and in this case, a range from 131073 KB to 262144 KB is increased for the controller 11. It should be noted that, that a quantity of logical addresses of the virtual block solid state disk herein is twice a quantity of logical addresses of the conventional solid state disk is only an example, and this embodiment is not limited to twice, provided that the quantity of logical addresses of the virtual block solid state disk is greater than the quantity of logical addresses of the conventional solid state disk. It can be understood that some solid state disk in an entire solid state disk group may use the virtual block technology to provide a greater logical address range, but some conventional solid state disks are still used. Alternatively, all solid state disks use the virtual block technology. This is not limited in this application.

Based on the described system garbage collection performed at the granularity of a stripe, after performing system garbage collection on at least one stripe in a logical chunk group, the controller 11 may obtain, as a new logical address of valid data, an unused logical address from logical addresses provided by the virtual block solid state disk for the controller 11. Because the quantity of logical addresses provided by the virtual block solid state disk is greater than the quantity of actual addresses of the virtual block solid state disk, the virtual block solid state disk includes some extra logical addresses relative to the conventional solid state disk with a same capacity. By using the extra logical addresses, the foregoing problem that there are still no sufficient allocable logical addresses after the system garbage collection is performed on the stripe basis can be resolved to some extent. By using a solid state disk that provides a greater address range, data collection performed at the granularity of a stripe can be better ensured, or data collection performed at the granularity of a stripe has a broader application range, so that collection is performed on the stripe basis for a larger quantity of times. Therefore, write amplification caused by the garbage collection performed on the logical chunk group basis can be further reduced.

Although the problem of insufficient allocable logical addresses can be resolved to some extent by using the extra logical addresses provided by the virtual block solid state disk, logical addresses of any disk are always limited. As more logical chunk groups are created, available logical addresses provided for the controller 11 by a hard disk are decreasing. When a quantity of available logical addresses is less than a specified address threshold, system garbage collection on the logical chunk group basis may be started. It can be understood that another condition may alternatively be used. For example, a percentage of a quantity of allocable logical addresses of the controller 11 to a total quantity of logical addresses exceeds a specified address threshold (in this case, the address threshold is a fraction), or a quantity of used logical addresses is greater than a specified address threshold. This is not limited in this application. Garbage collection for the entire logical chunk group is started under a specific condition, so that garbage collection processing is optimized. This is because a logical address allocated to the logical chunk group can be released and then allocated to another logical chunk group, only when the entire logical chunk group is collected. The system garbage collection performed on the logical chunk group basis has been detailed above, and is not described herein again. Based on this, this application provides another embodiment. In this embodiment, garbage collection may be performed at a granularity of a stripe or at a granularity of a logical chunk group. A specific garbage collection manner may be determined based on a used address threshold. When determining is performed by using an available logical address, when a quantity of available logical addresses of a solid state disk is less than a specified address threshold, data is collected at a granularity of a logical chunk group; or when the quantity of available logical addresses of the solid state disk is greater than the specified address threshold, data is collected at a granularity of a stripe. For a specific collection manner, refer to the specific descriptions in the foregoing embodiment. Details are not described herein again. When determining is performed by using a used logical address, a specific address threshold may be set or determined based on a status of logical addresses provided by the entire solid state disk group. For example, in a scenario in which a solid state disk uses a virtual block technology to provide a greater logical address range, the address threshold may be set to be greater than a smaller logical address range provided by the solid state disk.

This application provides another embodiment in which at least two stripes may be used as a data collection granularity. In this embodiment, a granularity of system garbage collection may be set to at least N stripes, where N is an integer greater than or equal to 2. In other words, in this implementation, each collection is performed on a basis of at least two strips. However, it is not limited to use a basis of two strips, and a basis of more than two stripes may alternatively be used. For a collection manner, refer to the foregoing descriptions of collection at a granularity of a single stripe. How to select the at least N stripes in one system garbage collection should be noted. For example, N is equals to 2. Two stripes with consecutive logical addresses in a logical chunk group may be selected. Each logical chunk is corresponding to a range of consecutive logical addresses, and each logical chunk includes one stripe unit of a plurality of stripes. Therefore, each stripe unit in the logical chunk is corresponding to one segment of logical address. Based on the logical address corresponding to each stripe unit, at least two stripe units with consecutive logical addresses may be selected, and then stripes corresponding to the stripe units are further determined. Correspondingly, when a data volume of invalid data is being counted, a data volume of invalid data included in two stripes with consecutive logical addresses are counted, so that system garbage collection is preferably performed on counted two stripes that include a maximum volume of invalid data.

Figure 4:
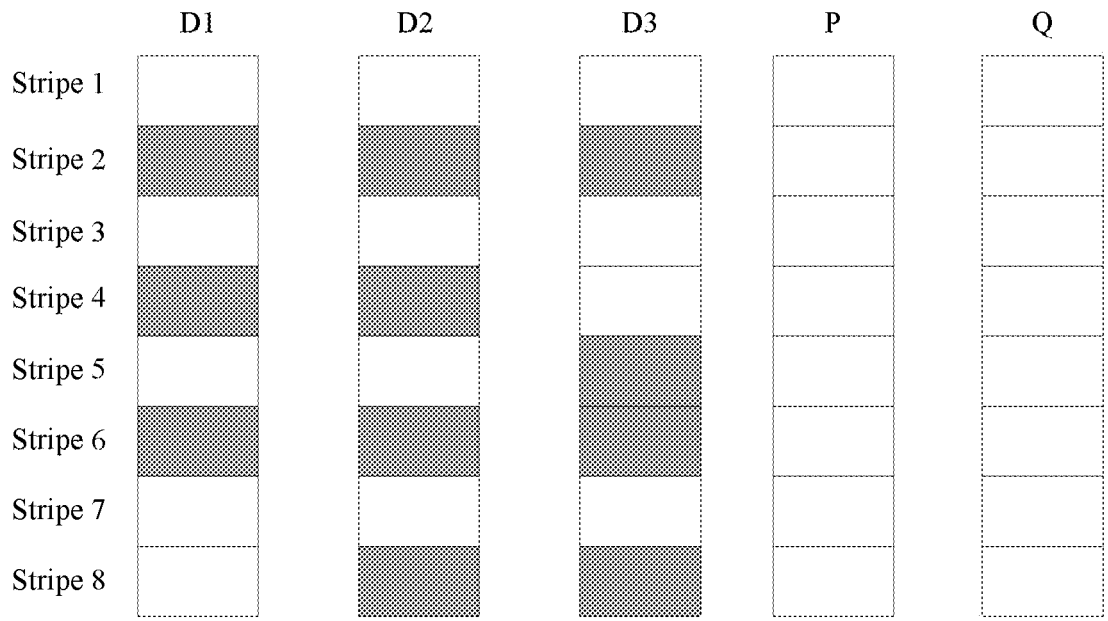
FIG. 4 is a schematic diagram of a stripe according to an embodiment of the present disclosure.

In the following, differences between system garbage collection performed on a stripe basis and system garbage collection performed on a logical chunk group basis are compared by using a specific example. Referring to FIG. 4, a logical chunk group shown in FIG. 4 includes eight stripes, and each stripe includes three data units (D1, D2, and D3) and two check units (P and Q). It is assumed that one logical chunk group includes approximately 50% of invalid data, a white part in FIG. 4 represents valid data, and a gray part represents invalid data. If system garbage collection is performed on the logical chunk group, space of 4 MB×5=20 MB can be released (it is assumed that a size of each logical chunk is 4 MB). However, if system garbage collection is performed at a granularity of a stripe, as shown in FIG. 4, a stripe 2 and a stripe 6 include most invalid data of the entire logical chunk group. If the system garbage collection is performed on the stripe 2 and the stripe 6, space of at least 10 MB can be released. Further, if a flash array further includes another logical chunk group similar to the logical chunk group shown in FIG. 4, the system garbage collection only needs to be performed on four stripes that include a maximum volume of invalid data in the two logical chunk groups, to obtain available space of 20 MB. Therefore, when available space of a same size is obtained, less valid data needs to be moved in the system garbage collection performed at the granularity of a stripe, and correspondingly, less write amplification is caused compared with the system garbage collection performed at the granularity of a logical chunk group. It can be understood that, to further reduce the write amplification, in this embodiment of the present disclosure, when the flash array has a plurality of logical chunk groups, a logical chunk group that includes a maximum volume of invalid data may be first selected, and then a stripe that includes a maximum volume of invalid data is selected from the logical chunk group. Alternatively, a stripe with a maximum volume of invalid data is directly determined from all the logical chunk groups in the entire solid state disk group, and then data collection is performed for the stripe.

In actual application, data sent by a host to a controller 11 is compressed and then stored in a stripe, and this may cause a problem that data stored in the stripe cannot be aligned. Being aligned means that data belonging to a same IO request is stored in one stripe, and "cannot be aligned" means that data belonging to a same IO request is distributed in at least two stripes. If data in the stripes cannot be aligned, data searching efficiency is affected. In consideration of this case, in this embodiment, when system garbage collection is being performed, that collected data is aligned in the stripe is ensured as much as possible.

To ensure data alignment as much as possible, this application provides another embodiment. In this embodiment, after a stripe that includes a maximum volume of invalid data is selected, it is determined whether data included in the stripe belongs to a same IO request as data included in another stripe. If the data included in the stripe belongs to the same IO request as the data included in the another stripe, valid data that is included in the another stripe and that belongs to the IO request is moved to a new logical address, and the new logical address is contiguous to a new logical address to which valid data in a target stripe is moved. This is to ensure that data belonging to a same I/O request is stored together as much as possible. For example, the another stripe may be an adjacent stripe of the stripe, and the adjacent stripe is a stripe whose logical address is contiguous to a logical address of the stripe. Determining whether the data included in the another stripe belongs to the same IO request as the data included in the adjacent stripe of the stripe may also be understood as: determining whether the IO request to which the data in the stripe belongs further includes some data distributed in the another stripe. In actual application, each logical chunk includes a small space part used for storing data description information, and the description information is used to describe data stored in the logical chunk. Specifically, the description information may include but is not limited to an identifier of an IO request to which the data belongs (for example, address information of the IO request), a start address of the data in the logical chunk, and a size of the data. Based on the description information, the controller 11 can determine whether the data belonging to the same IO request is distributed in two stripes. For example, a size of a stripe unit is 8 KB. If description information of a logical chunk includes: a start address of data in an IO request is 7 KB and a size is 2 KB, it may be determined that an address of the data exceeds a boundary of the stripe. Therefore, the data included in the IO request is distributed in two stripes.

If a data read request is used to request to read data stored at an actual address that has been released according to an unmap command or a trim command, data with a special mark (for example, all zeros) is returned in response to the data read request. In some scenarios, the controller 11 needs to perform reconstruction processing on data in a stripe. Data reconstruction means that when one or more (a quantity depends on a RAID type) stripe units in the stripe are faulty, the faulty stripe units may be obtained through recalculation based on a remaining normal stripe unit by using a RAID algorithm. In a data reconstruction scenario, the controller 11 performs a data check. If the check fails, data in each stripe unit is read. If the data in the stripe unit is data that is released after system garbage collection is performed, the check succeeds by default and no processing is performed. If the data in the stripe unit is not data that is released after system garbage collection is performed, data reconstruction is performed according to an existing procedure.

Figure 5:
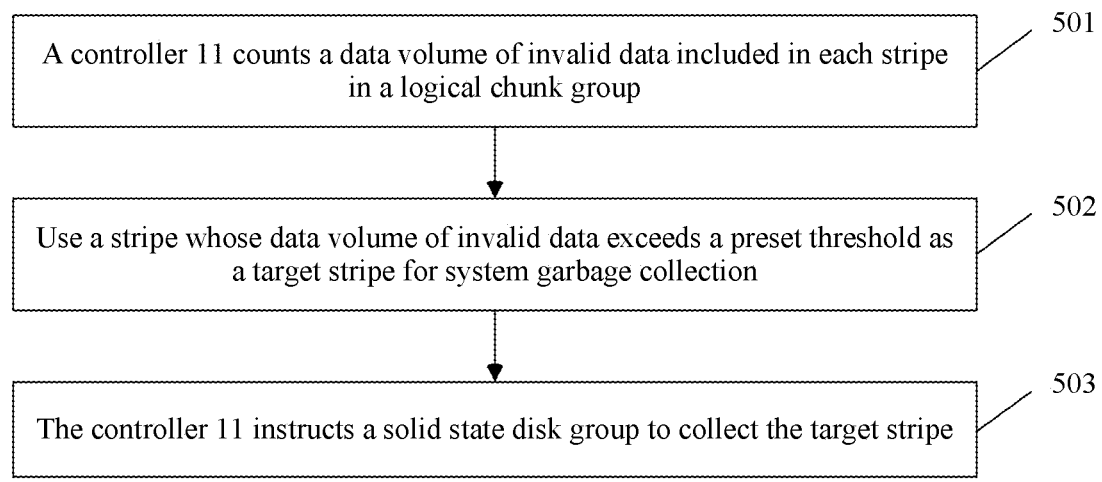
FIG. 5 is a schematic flowchart of a system garbage collection method according to an embodiment of the present disclosure.

With reference to FIG. 5, the following describes a system garbage collection method provided in an embodiment of the present disclosure. The method may be applied to the flash array shown in FIG. 1, and may be performed by the controller 11 in the embodiment shown in FIG. 2. As shown in FIG. 5, the method includes the following steps:

501. The controller 11 counts a data volume of invalid data included in each stripe in a logical chunk group. The logical chunk group may be any logical chunk group in the flash array, may be a logical chunk group that includes a maximum volume of invalid data, or may be a plurality of logical chunk groups provided by a solid state disk group. It can be understood that system garbage collection efficiency is higher when the logical chunk group is the logical chunk group that includes the maximum volume of invalid data in the flash array. In addition, the controller 11 may count a data volume of invalid data by using a bitmap stored in the controller 11. For details, refer to the descriptions in the foregoing embodiment about recording the validity of the data by the controller 11 by using the bitmap. Details are not described herein again.

502. Use a stripe whose data volume of invalid data exceeds a specified volume threshold as a target stripe for system garbage collection. In this manner, one or more target stripes may be selected from stripes included in the logical chunk group, to perform system garbage collection. After the collection is completed, a next stripe whose data volume of invalid data exceeds the specified volume threshold is selected. In another implementation, the controller 11 selects a stripe that includes a maximum volume of invalid data as an object for system garbage collection. After the collection is completed, a next stripe that includes a maximum volume of invalid data is selected. For details, refer to the descriptions in the foregoing embodiment about performing system garbage collection by the controller 11 at the granularity of a stripe. Details are not described herein again.

503. The controller 11 instructs the solid state disk group to collect the target stripe. For example, the controller 11 sends an original logical address of valid data included in the target stripe to the solid state disk group; and the solid state disk group reads the valid data from the original logical address, and sends the valid data to the controller 11. Then, the controller 11 sends a data write request to the solid state disk group, where the data write request includes a new logical address allocated by the controller 11 to the valid data. After receiving the data write request, the solid state disk group moves the valid data to the new logical address. In addition, a trigger condition for system garbage collection may be determining that available space of the solid state disk group is insufficient, and this step may be performed before step 503. For details, refer to the trigger condition for system garbage collection in the foregoing embodiment. The available space is total storage space in the flash array minus occupied space. Subsequently, the controller 11 sends an unmap command to the solid state disk group, where the unmap command is used to instruct the solid state disk group to delete a correspondence between the original logical address and an actual address of the target stripe. Moreover, the solid state disk group may further mark the actual address as an address that includes no valid data. When the solid state disk 22 performs internal garbage collection, valid data at the address may not be moved. For details, refer to the specific descriptions in the foregoing embodiment about performing system garbage collection by the controller 11 at the granularity of a stripe. Details are not described herein again.

After step 503 is performed, the correspondence between the logical address and the actual address of the target stripe is canceled. A solid state disk 22 periodically performs internal garbage collection to erase a chunk that includes no valid data. In this case, the actual address occupied by the target stripe may be collected to receive new data. However, it should be noted that, although the actual address of the target stripe is collected, the logical address of the target stripe is unreleased until a logical address of the logical chunk group in which the target stripe is located is released. The released logical address can be allocated to another logical chunk group in the solid state disk group.

After the target stripe is collected, the controller 11 may select a next target stripe as a collection object. The next target stripe may be a stripe includes a maximum volume of invalid data in the logical chunk group, or may be a stripe whose data volume of invalid data exceeds the specified volume threshold. Specifically, operations 502 to 503 may be repeated. Details are not described herein again.

Optionally, the system garbage collection shown in FIG. 5 may be applied to the vblock technology field. To be specific, a quantity of logical addresses that are provided for the controller 11 by the solid state disk 22 included in the flash array to which the method is applied is greater than a quantity of actual addresses of the solid state disk.

Figure 6:
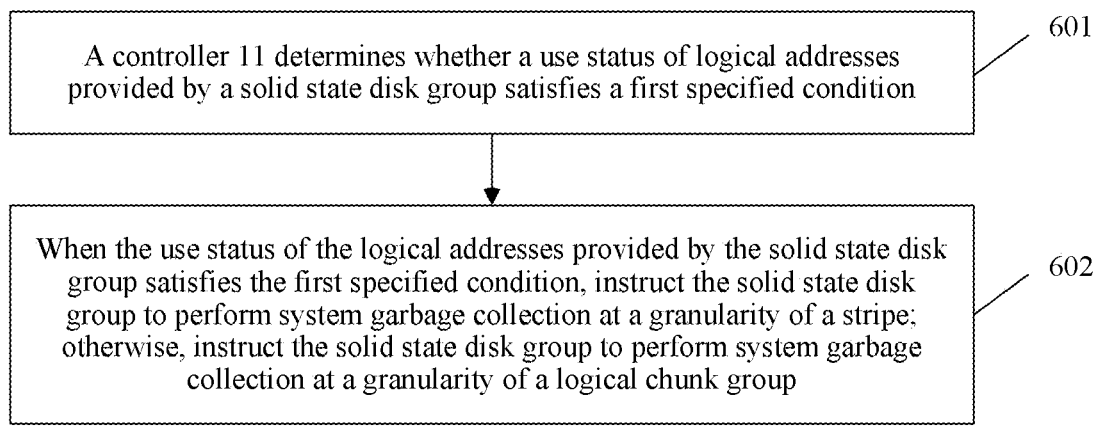
FIG. 6 is a schematic flowchart of another system garbage collection method according to an embodiment of the present disclosure.

An embodiment of the present disclosure further provides another system garbage collection method. The method may be applied to the flash array shown in FIG. 1, and is performed by the controller 11 in the embodiment shown in FIG. 2. As shown in FIG. 6, the method may include the following steps:

601. The controller 11 determines whether a use status of logical addresses provided by a solid state disk group satisfies a first specified condition. The first specified condition herein may be that a quantity of allocable logical addresses in the logical addresses provided by the solid state disk group is greater than a first address threshold, that a quantity of used logical addresses in the logical addresses provided by the solid state disk group is greater than a second address threshold, or that a percentage of a quantity of allocable logical addresses to a total quantity of logical addresses exceeds a specified address threshold. For details, refer to the descriptions in the foregoing embodiment about system garbage collection performed on the logical chunk group basis. Details are not described herein again.

602. When the quantity of allocable logical addresses provided by the solid state disk group is greater than the specified address threshold, instruct the solid state disk group to perform garbage collection on a stripe basis. For details, refer to the descriptions in steps 501 to 503 shown in FIG. 5 and the descriptions in the foregoing embodiment about performing garbage collection by the controller 11 at the granularity of a stripe. Details are not described herein again. In addition, it can be learned from the foregoing descriptions that write amplification caused by system garbage collection performed on the stripe basis is less than that caused by system garbage collection performed on a logical chunk group basis. Moreover, when the quantity of allocable logical addresses provided by the solid state disk group is less than the specified address threshold, the solid state disk group is instructed to perform garbage collection on the logical chunk group basis. For details, refer to the descriptions in the foregoing embodiment about system garbage collection performed at the granularity of a logical chunk group. Details are not described herein again. After a stripe is collected, a logical address of the stripe cannot be immediately collected, and the logical address of the stripe can be released only after all stripes included in a logical chunk group in which the stripe is located are collected. Therefore, as user data increases, allocable logical addresses of the controller 11 gradually decrease. When the quantity of allocable logical addresses is less than the specified address threshold, garbage collection is performed on the logical chunk group basis, to increase the quantity of allocable logical addresses.

Optionally, before step 601, the controller 11 may further determine whether available space of the solid state disk group satisfies a second specified condition. The second specified condition herein is a trigger condition for system garbage collection. When the second specified condition is satisfied, the controller 11 performs steps 601 and 602. Specifically, for the second specified condition herein, refer to the descriptions in the foregoing embodiment about the trigger condition for system garbage collection.

Optionally, system garbage collection shown in FIG. 6 may be applied to the vblock technology field. To be specific, a quantity of logical addresses that are provided for the controller 11 by a solid state disk 22 included in the flash array to which the method is applied is greater than a quantity of actual addresses of the solid state disk. For details, refer to the descriptions of using the virtual block technology in the foregoing embodiment. Details are not described herein again.

Figure 7:
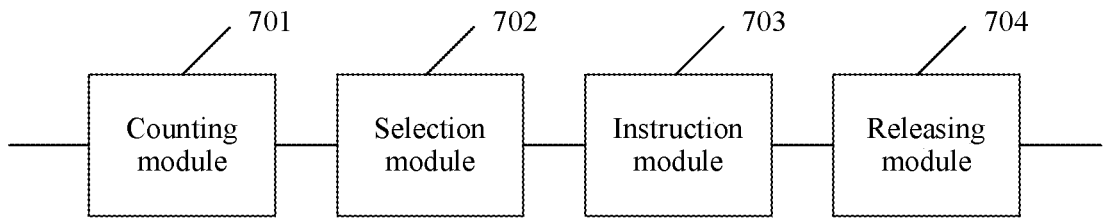
FIG. 7 is a schematic structural diagram of a system garbage collection apparatus according to an embodiment of the present disclosure.

An embodiment of the present disclosure further provides a system garbage collection apparatus. The apparatus is located in the controller 11 in the flash array shown in FIG. 1. The flash array includes the controller 11 and a solid state disk group, the solid state disk group includes a plurality of solid state disks 22, the solid state disk group includes a logical chunk group, and the logical chunk group includes a plurality of stripes (referring to FIG. 3). For example, as shown in FIG. 7, the apparatus includes a counting module 701, a selection module 702, and an instruction module 703.

The counting module 701 is configured to count a data volume of invalid data included in each of the plurality of stripes. For details, refer to the descriptions of step 501 shown in FIG. 5 and the descriptions in the foregoing embodiment about recording the validity of the data by the controller 11 by using the bitmap. The selection module 702 is configured to select at least one target stripe from the plurality of stripes, where the target stripe is a stripe in the plurality of stripes that includes invalid data whose volume exceeds a specified volume threshold. For details, refer to the descriptions of step 502 shown in FIG. 5 and the descriptions in the foregoing embodiment about performing system garbage collection by the controller 11 at the granularity of a stripe. The instruction module 703 is configured to: instruct the solid state disk group to collect the target stripe to delete a correspondence between a logical address of the target stripe and an actual address of the target stripe; and keep the logical address of the target stripe unreleased until a logical address of the logical chunk group is released. For details, refer to the descriptions of step 503 shown in FIG. 5 and the descriptions in the foregoing embodiment about performing system garbage collection by the controller 11 at the granularity of a stripe.

Optionally, the instruction module 703 is further configured to: before instructing the solid state disk group to collect the target stripe, determine that available space of the solid state disk group is insufficient. For details, refer to the descriptions in the foregoing embodiment about the trigger condition for system garbage collection.

Optionally, the apparatus may further include a releasing module 704, and the releasing module 704 is configured to: when all stripes included in the logical chunk group are collected, release the logical address allocated by the controller to the logical chunk group, where the logical address of the target stripe is a subset of the logical address of the logical chunk group.

Optionally, that the instruction module 703 is specifically configured to instruct the solid state disk group to move valid data in the target stripe to a newly allocated first logical address.

Optionally, the instruction module 703 is further configured to: determine an IO request to which data in the target stripe belongs; and when some data included in the IO request is stored in another stripe, instruct the solid state disk group to move valid data in the some data to a newly allocated second logical address, where the second logical address is contiguous to the first logical address. For details, refer to the descriptions in the foregoing embodiment about ensuring data alignment. Details are not described herein again.

All the modules shown in FIG. 7 may separately be executed by the processor 112 shown in FIG. 2, or may be executed by the processor 112 by invoking a program in the memory 111.

In addition, there is another implementation for the system garbage collection apparatus shown in FIG. 7. In this implementation, the counting module 701 is configured to determine whether a use status of logical addresses provided by the solid state disk group satisfies a first specified condition. For details, refer to step 601 shown in FIG. 6 and the descriptions in the foregoing embodiment about system garbage collection performed on the logical chunk group basis. Details are not described herein again. The instruction module 703 is configured to: when a quantity of allocable logical addresses provided by the solid state disk group is greater than a specified address threshold, instruct the solid state disk group to perform garbage collection on a stripe basis; or when the quantity of allocable logical addresses provided by the solid state disk group is less than the specified address threshold, instruct the solid state disk group to perform garbage collection on a logical chunk group basis. For details, refer to the descriptions of step 602 shown in FIG. 6, the descriptions in the foregoing embodiment about performing garbage collection by the controller 11 at the granularity of a stripe, and the descriptions in the foregoing embodiment about system garbage collection performed at the granularity of a logical chunk group.

Specifically, when garbage collection is performed at the granularity of a stripe, the counting module 701 is further configured to count a data volume of invalid data included in each of the plurality of stripes. For details, refer to the descriptions of step 501 shown in FIG. 5 and the descriptions in the foregoing embodiment about recording the validity of the data by the controller 11 by using the bitmap. The selection module 702 is configured to select at least one target stripe from the plurality of stripes, where the target stripe is a stripe in the plurality of stripes that includes invalid data whose volume exceeds a specified volume threshold. For details, refer to the descriptions of step 502 shown in FIG. 5 and the descriptions in the foregoing embodiment about performing system garbage collection by the controller 11 at the granularity of a stripe.

A person of ordinary skill in the art understands that each aspect of the present disclosure or the possible implementations of each aspect may specifically be implemented as a system, a method, or a computer program product. Therefore, each aspect of the present disclosure or the possible implementations of each aspect may be implemented in a form of hardware only embodiments, software only embodiments (including firmware, resident software, and the like), or embodiments with a combination of software and hardware, which are collectively referred to as a "circuit", "module", or "system" herein. In addition, each aspect of the present disclosure or the possible implementations of each aspect may be implemented in a form of a computer program product, and the computer program product is computer-readable program code stored in a computer-readable medium.

The computer-readable medium includes but is not limited to an electronic, magnetic, optical, electromagnetic, infrared, or semiconductor system, device, or apparatus, or any appropriate combination thereof, such as a random-access memory (RAM), a read-only memory (ROM), an erasable programmable read-only memory (EPROM), and a compact disc.

A processor in a computer reads computer-readable program code stored in the computer-readable medium, so that the processor can perform a function and an action specified in each step or a combination of steps in a flowchart.

All computer-readable program code may be executed on a user computer, or some may be executed on a user computer as a standalone software package, or some may be executed on a user computer while some is executed on a remote computer, or all may be executed on a remote computer or a server. It should also be noted that, in some alternative implementation solutions, steps in the flowcharts or functions described in blocks in the block diagrams may not be performed in the illustrated order. For example, illustrated two consecutive steps or two blocks, which depend on an involved function, may actually be executed substantially at the same time, or sometimes these blocks may be executed in reverse order.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person of ordinary skill in the art may use a different method to implement the described functions for each particular application, but it should not be considered that the implementation goes beyond the scope of the present disclosure.

The foregoing descriptions are merely specific implementations of the present disclosure, but are not intended to limit the protection scope of the present disclosure. Any variation or replacement readily figured out by a person of ordinary skill in the art within the technical scope disclosed in the present disclosure shall fall within the protection scope of the present disclosure. Therefore, the protection scope of the present disclosure shall be subject to the protection scope of the claims.

What is claimed is:

1. A system controller, comprising a processor and an interface, wherein:
   the interface is configured to communicate with a solid state disk group comprising a plurality of solid state disks; and
   the processor is configured to:
   count a data volume of invalid data in each of a plurality of stripes of a logical chunk group, wherein the logical chunk group is included in the solid state disk group;

select a first stripe from the plurality of stripes, wherein the first stripe comprises invalid data whose volume exceeds a specified volume threshold;

instruct the solid state disk group to move valid data in the first stripe to a second stripe of the plurality of stripes;

instruct the solid state disk group to delete a correspondence between a logical address of the first stripe and an actual address of the first stripe; and keep the logical address of the first stripe unreleased until a logical address of the logical chunk group is released.

2. The system controller according to claim 1, wherein the processor is further configured to track a quantity of logical addresses provided by each of the plurality of solid state disks for the system controller, and wherein the quantity of logical addresses is greater than a quantity of actual addresses of the solid state disk.

3. The system controller according to claim 1, wherein the logical chunk group comprises a plurality of logical chunks, and each logical chunk comes from a different solid state disk.

4. The system controller according to claim 1, wherein the processor is further configured to: determine that available space of the solid state disk group is insufficient, before instructing the solid state disk group to move the valid data.

5. The system controller according to claim 1, wherein the processor is further configured to: release the logical address allocated by the processor to the logical chunk group, wherein the logical address of the first stripe is a subset of the logical address of the logical chunk group.

6. The system controller according to claim 5, wherein the processor is further configured to allocate the released logical address to another logical chunk group in the solid state disk group.

7. The system controller according to claim 1, wherein when the processor instructs the solid state disk group to move valid data, the processor is configured to:

instruct the solid state disk group to read the valid data in the first stripe; and send a data write instruction to the solid state disk group, wherein the data write instruction comprises a first logical address in the second stripe and the valid data.

8. The system controller according to claim 1, wherein the second stripe is adjacent to the first stripe, and a logical address of a stripe unit comprised in the second stripe is contiguous to a logical address of a stripe unit comprised in the first stripe.

9. A system garbage collection method, wherein the method is applied to a flash array, the flash array comprises a controller and a solid state disk group, the solid state disk group comprises a plurality of solid state disks, the solid state disk group comprises a logical chunk group, the logical chunk group comprises a plurality of stripes, wherein the method performed by the controller comprises:

counting a data volume of invalid data comprised in each of the plurality of stripes;

selecting a first stripe from the plurality of stripes, wherein the first stripe is a stripe in the plurality of stripes that comprises invalid data whose volume exceeds a specified volume threshold;

instructing the solid state disk group to move valid data in the first stripe to a second stripe;

instructing the solid state disk group to delete a correspondence between a logical address of the first stripe and an actual address of the first stripe; and keeping the logical address of the first stripe unreleased until a logical address of the logical chunk group is released.

10. The method according to claim 9, further comprising:

tracking a quantity of logical addresses provided by each of the plurality of solid state disks for the controller, wherein the quantity of logical addresses is greater than a quantity of actual addresses of the solid state disk.

11. The method according to claim 9, wherein the logical chunk group comprises a plurality of logical chunks, and each logical chunk comes from a different solid state disk.

12. The method according to claim 9, wherein the method further comprises: before instructing the solid state disk group to move the valid data, determining that available space of the solid state disk group is insufficient.

13. The method according to claim 9, wherein the method further comprises: releasing the logical address allocated by the controller to the logical chunk group, wherein the logical address of the target stripe is a subset of the logical address of the logical chunk group.

14. The method according to claim 9, wherein the instructing the solid state disk group to move valid data in the target stripe comprises: instructing the solid state disk group to read the valid data in the target stripe; and sending a data write instruction to the solid state disk group, wherein the data write instruction comprises a first logical address in the second stripe and the valid data.

15. The method according to claim 14, wherein the second stripe is adjacent to the first stripe, and a logical address of a stripe unit comprised in the second stripe is contiguous to a logical address of a stripe unit comprised in the first stripe.

* * * * *